US012715464B2

(12) United States Patent
Ahn et al.

(10) Patent No.: US 12,715,464 B2
(45) Date of Patent: Aug. 25, 2026

(54) STEERING MODE GUIDANCE SYSTEM AND METHOD OF VEHICLE CORNER MODULE DEVICE

(71) Applicant: HYUNDAI MOBIS CO., LTD., Seoul (KR)

(72) Inventors: Sung Joon Ahn, Yongin-si (KR); Seung Hyeong Choe, Yongin-si (KR); Tae Hun Kim, Yongin-si (KR); Jong Min Lee, Yongin-si (KR); Moon Cheon Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 9 days.

(21) Appl. No.: 18/965,176

(22) Filed: Dec. 2, 2024

(65) Prior Publication Data

US 2025/0346246 A1 Nov. 13, 2025

(30) Foreign Application Priority Data

May 7, 2024 (KR) ........................ 10-2024-0059860

(51) Int. Cl.

| | |
|---|---|
| ***B60W 50/14*** | (2020.01) |
| ***B60W 30/182*** | (2020.01) |
| ***B60W 50/08*** | (2020.01) |

(52) U.S. Cl.

CPC .......... *B60W 50/14* (2013.01); *B60W 30/182* (2013.01); *B60W 50/082* (2013.01); *B60W 2050/143* (2013.01); *B60W 2050/146* (2013.01); *B60W 2520/10* (2013.01)

(58) Field of Classification Search

CPC .. B60W 50/14; B60W 30/182; B60W 50/082; B60W 2050/143; B60W 2050/146; B60W 2520/10

See application file for complete search history.

(56) References Cited

U.S. PATENT DOCUMENTS

| | | | | |
|---|---|---|---|---|
| 12,037,061 | B2 * | 7/2024 | Xiao | B62D 6/003 |
| 2006/0113119 | A1 * | 6/2006 | Dudeck | B62D 15/028 180/6.2 |
| 2010/0271236 | A1 * | 10/2010 | Moshchuk | B62D 15/0285 340/932.2 |

(Continued)

FOREIGN PATENT DOCUMENTS

| | | | | |
|---|---|---|---|---|
| CN | 107776569 A | * | 3/2018 | B62D 15/0285 |
| DE | 10261176 A1 | * | 7/2004 | B62D 15/028 |

(Continued)

OTHER PUBLICATIONS

Extended European Search Report issued Apr. 4, 2025 in counterpart European Patent Application No. 24209362.3 (12 pages in English).

*Primary Examiner* — Chico A Foxx
(74) *Attorney, Agent, or Firm* — NSIP Law

(57) ABSTRACT

A steering mode guidance system of a vehicle corner module device for a vehicle, and a method therefor are provided. The system includes a sensor, and a processor to measure an area of a space region into which a vehicle intends to enter using the sensor, determine whether trajectory switching is possible for each steering mode of the vehicle in the space region on the basis of the measured area information, and provide information on a steering mode in which the trajectory switching is possible on the basis of the determination result.

12 Claims, 10 Drawing Sheets

(56) References Cited

U.S. PATENT DOCUMENTS

| | | | | |
|---|---|---|---|---|
| 2013/0144492 | A1 * | 6/2013 | Takano | B62D 15/0285 701/1 |
| 2014/0316655 | A1 * | 10/2014 | Degenstein | B62D 6/008 701/41 |
| 2015/0134202 | A1 * | 5/2015 | Dawson | B60K 17/356 701/41 |
| 2016/0068183 | A1 * | 3/2016 | Matsuoka | B60L 15/025 701/41 |
| 2016/0075374 | A1 * | 3/2016 | Yamashita | B62D 15/0285 701/41 |
| 2018/0025647 | A1 * | 1/2018 | Krnja | G08G 1/166 340/905 |
| 2019/0185055 | A1 * | 6/2019 | Iwami | B60W 30/06 |
| 2022/0126914 | A1 * | 4/2022 | Park | B60K 35/22 |
| 2022/0227399 | A1 * | 7/2022 | Kneip | B60W 60/0061 |
| 2024/0278773 | A1 * | 8/2024 | Holler | B60K 17/358 |

FOREIGN PATENT DOCUMENTS

| | | | | | |
|---|---|---|---|---|---|
| JP | 2000272445 | A | * | 10/2000 | B62D 15/0275 |
| JP | 2001158313 | A | * | 6/2001 | |
| JP | 2008024195 | A | * | 2/2008 | |
| JP | 4798493 | B2 | * | 10/2011 | |
| JP | 2014-4930 | A | | 1/2014 | |
| JP | 2014004930 | A | * | 1/2014 | |
| JP | 7581137 | B2 | * | 11/2024 | |
| KR | 10-2013-0104206 | A | | 9/2013 | |
| KR | 10-2016-0031910 | A | | 3/2016 | |
| KR | 20160031910 | A | * | 3/2016 | B60W 30/06 |
| KR | 10-2020-0135663 | A | | 12/2020 | |
| WO | WO 2022/262890 | A1 | | 12/2022 | |

* cited by examiner

STEERING MODE GUIDANCE SYSTEM AND METHOD OF VEHICLE CORNER MODULE DEVICE

CROSS-REFERENCE TO RELATED APPLICATION

This application claims priority from and the benefit under 35 USC § 119 of Korean Patent Application No 10-2024-0059860 filed on May 7, 2024, in the Korean Intellectual Property Office, the entire disclosure of which is hereby incorporated by reference for all purposes.

BACKGROUND

1. Field

Exemplary embodiments of the present disclosure relate to a steering mode guidance system and method of a vehicle corner module device

2. Description of the Related Art

When a vehicle arrives at a location/space where it is to be parked and a steering mode of a corner module device (e-corner system) is switched, the e-corner system uses sensors applied to the vehicle to receive an alarm according to a distance between the vehicle and an external object after the vehicle moves. This may cause constraints of space on mode switching to be utilized.

In addition, after becoming proficient at driving, a driver should visually recognize a space where the driver wants to park a vehicle and anticipate whether it is a space for a mode to be switched to before operating the vehicle. When an angle is changed, such as when the vehicle rotates in place, since the vehicle should be adjusted only by a brake after the vehicle is operated, there is a problem in that a line may be misaligned and the operation and driving should be readjusted.

Meanwhile, there is a problem in that it is difficult for the driver to directly see with driver's own eyes that the steering mode of the e-corner system is changed in the vehicle. In addition, when a system error occurs, an unintended operation may occur and it is necessary to notify the driver that the steering mode has been switched to the one selected by the driver.

The related art of the present disclosure is disclosed in Korean Laid-Open Patent Application No. 10-2013-0104206 (published on Sep. 25, 2013).

SUMMARY

Various embodiments are directed to a steering mode guidance system and method of a vehicle corner module device, which can provide driving safety by determining whether switching for each steering mode is possible in relation to switching of a steering mode of the vehicle corner module device.

In a general aspect of the disclosure, a steering mode guidance system of a vehicle corner module device for a vehicle, includes: a sensor; and a processor configured to: measure an area of a space region into which a vehicle intends to enter using the sensor; determine whether trajectory switching is possible for each steering mode of the vehicle in the space region on the basis of the measured area information; and provide information on a steering mode in which the trajectory switching is possible on the basis of the determination result.

The system may further include an input button, wherein the processor may be further configured to: activate an automatic sensing function of the sensor in response to a manipulation of the input button; sense the space region into which the vehicle intends to enter through the automatic sensing function of the sensor to generate sensing data; and measure the area of the space region using the generated sensing data.

The processor may be further configured to: calculate reference position information for performing each steering mode on the basis of current position information acquired through navigation of the vehicle and the measured area information; and provide a driver of the vehicle with the calculated reference position information in the form of a plan view image by imaging the calculated reference position information together with the measured area information and the current position information in response to any one of steering modes in which the trajectory switching is possible being selected according to a manipulation of the input button.

In response to any one of steering modes in which the trajectory switching is possible being selected according to the manipulation of the input button, the processor may be further configured to provide the driver with a notification signal indicating that the steering mode of the corner module device is switched visually and audibly.

In response to a speed of the vehicle decreasing to a preset speed or less, the processor may be further configured to: activate an automatic sensing function of the sensor; sense the space region into which the vehicle intends to enter through the automatic sensing function of the sensor to generate sensing data; and measure the area of the space region using the generated sensing data.

The system may further include a memory, wherein the processor may be further configured to: calculate a vehicle moving trajectory for each steering mode on the basis of vehicle-specific specification information stored in the memory; compare and match the calculated vehicle moving trajectory with the measured area information; and determine whether the trajectory switching for each steering mode is possible in the space region.

The steering mode in which the trajectory switching is possible may include a zero-turn mode and a pivot-turn mode.

In another general aspect of the disclosure, a steering mode guidance method of a vehicle corner module device for a vehicle, includes: measuring, by a processor, an area of a space region into which the vehicle intends to enter using a sensor; determining, by the processor, whether trajectory switching for each steering mode of the vehicle is possible in the space region on the basis of the measured area information; and providing, by the processor, information on a steering mode in which the trajectory switching is possible on the basis of the determination result.

The measuring of the area of the space region may include: activating, by the processor, an automatic sensing function of the sensor in response to a manipulation of an input button; sensing, by the processor, a space region into which the vehicle intends to enter through the automatic sensing function of the sensor and generating sensing data; and measuring, by the processor, the area of the space region using the generated sensing data.

The measuring of the area of the space region may include: activating, by the processor, an automatic sensing function of the sensor in response to a speed of the vehicle decreasing to a preset speed or less; sensing, by the processor, a space region into which the vehicle intends to enter through the automatic sensing function of the sensor and generating sensing data; and measuring, by the processor, the area of the space region using the generated sensing data.

The determining of whether the trajectory switching for each steering mode of the vehicle is possible may include: calculating, by the processor, a vehicle moving trajectory for each steering mode on the basis of vehicle-specific specification information stored in a memory; and comparing and matching, by the processor, the generated vehicle moving trajectory with the measured area information to determine whether the trajectory switching for each steering mode is possible in the space region.

The steering mode in which the trajectory switching is possible may include a zero-turn mode and a pivot-turn mode.

DETAILED DESCRIPTION

Figure 1:
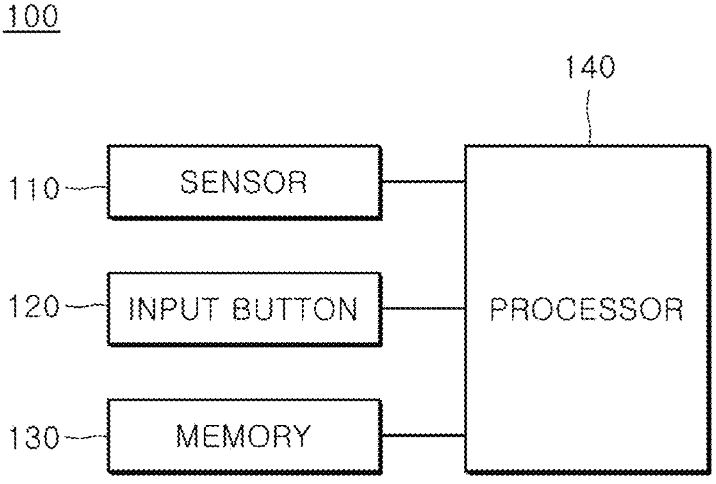
FIG. 1 is a block diagram illustrating a steering mode guidance system of a vehicle corner module device according to one embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Further-more, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

FIG. 1 is a block diagram illustrating a steering mode guidance system of a vehicle corner module device according to one embodiment of the present disclosure.

Referring to FIG. 1, a steering mode guidance system 100 of a vehicle corner module device according to one embodiment of the present disclosure may include a sensor 110, an input button 120, a memory 130, and a processor 140.

The sensor 110 may sense a space region into which a vehicle intends to enter to generate sensing data and transmit the generated sensing data to the processor 140 as basic data for measuring an area of the space region.

Here, the space region may be a front space region of the vehicle, but the present disclosure is not limited thereto and the space region may include a rear or side space region.

The sensor 110 may include a camera, light detection and ranging (LiDAR), and the like. However, the sensor 110 is not limited thereto and may include a sensor capable of measuring a distance, such as radio detecting and ranging (RADAR).

The input button 120 may perform a function of driving the steering mode guidance system of a vehicle corner module device by generating an input signal according to a manipulation of a user (driver) and transmitting the input signal to the processor 140.

In addition, the input button 120 may perform a function of changing (switching) a steering mode of the vehicle according to the manipulation of the driver. The input button 120 may be various types of buttons, for example, a mechanical button, a touch pad, a dial, and the like, which are formed in a predetermined region inside the vehicle.

In this way, the input button 120 may be mechanically installed inside the vehicle, and alternatively, the input button 120 may be implemented in various ways, such as being implemented on a monitor screen provided inside the vehicle.

The memory 130 may store information on a steering mode changed by the manipulation of the input button 120. In addition, the memory 130 may store vehicle-specific specification information. The information stored in the memory 130 may be utilized when the processor 140 performs processing to guide a steering mode of the vehicle corner module device.

The memory 130 may be implemented as an internal memory such as a read only memory (ROM) (e.g., an electrically erasable programmable ROM (EEPROM)) or a random access memory (RAM), which is included in the processor 140 or may be implemented as a separate memory from the processor 140.

In this case, according to the purpose of data storage, the memory 130 may be implemented in the form of a memory embedded in the corner module device or in the form of a memory detachably attached to the corner module device.

For example, as for the memory 130, data for driving the corner module device may be stored in a memory embedded in the corner module device, and data for an expansion function of the corner module device may be stored in a memory detachably attached to the corner module device.

Here, the memory embedded in the corner module device may be implemented as at least one of a volatile memory (e.g., a dynamic RAM (DRAM), a static RAM (SRAM), or a synchronous DRAM (SDRAM)), a non-volatile memory (e.g., a one-time programmable ROM (OTPROM), programmable ROM (PROM), erasable and a programmable ROM (EPROM), an EEPROM, a mask ROM, a flash ROM, a flash memory (e.g., a NAND flash or a NOR flash), a hard drive, or a solid state drive (SSD)).

In addition, the memory detachably attached to the corner module device may be implemented in the form of a memory card (e.g., a compact flash (CF) card, a secure digital (SD) card, a micro-SD card, a mini-SD card, an extreme digital (xD) card, a multi-media card (MMC), etc.), an external memory connectable to a universal serial bus (USB) (e.g., a USB memory), etc.

The processor 140 may entirely control operations of the steering mode guidance system 100 of a vehicle corner module device according to one embodiment of the present disclosure, i.e., the sensor 110, the input button 120, and the memory 130.

In particular, the processor 140 may perform processing for guide a steering mode of the vehicle corner module device to the driver in conjunction with the sensor 110, the input button 120, and the memory 130. This will be described in detail below.

Figure 2:
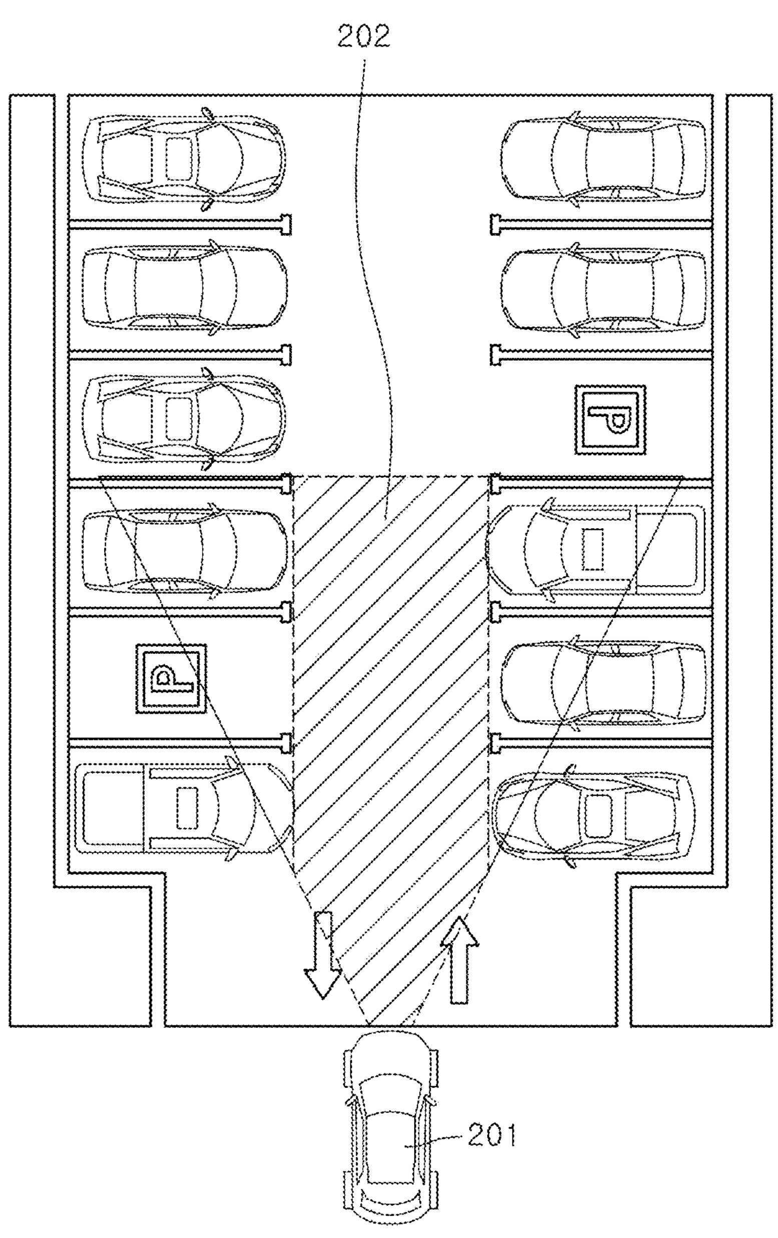
FIG. 2 is an exemplary diagram for describing a process of measuring an area of a space region into which a vehicle intends to enter according to one embodiment of the present disclosure.

As shown in FIG. 2, the processor 140 may measure an area of a space region 202 into which a vehicle 201 intends to enter using the sensor 110. In this case, when the driver of the vehicle manipulates the input button 120 or a speed of the vehicle decreases to a preset speed or less, the processor 140 may activate the sensor 110 to measure the area of the space region into which the vehicle intends to enter.

That is, in response to the manipulation of the input button 120, the processor 140 may activate an automatic sensing function of the sensor 110. Alternatively, when the speed of the vehicle decreases to a preset speed or less, the processor 140 may activate the automatic sensing function of the sensor 110.

The processor 140 may sense the space region into which the vehicle intends to enter through the automatic sensing function of the sensor 110 and generate sensing data. The processor 140 may measure the area of the space region using the generated sensing data.

The processor 140 may determine whether trajectory switching for each steering mode of the vehicle is possible in the space region into which the vehicle intends to enter on the basis of the measured area information.

Specifically, the processor 140 may calculate a vehicle moving trajectory for each steering mode on the basis of vehicle-specific specification information stored in the memory 130. The processor 140 may compare and match the calculated vehicle moving trajectory with the measured area information to determine whether the trajectory switching for each steering mode of the vehicle is possible in the space region into which the vehicle intends to enter.

The processor 140 may provide the driver with information on the steering mode in which the trajectory switching is possible on the basis of the determination result. In this case, the processor 140 may provide the information to the driver visually and/or audibly.

Figure 3:
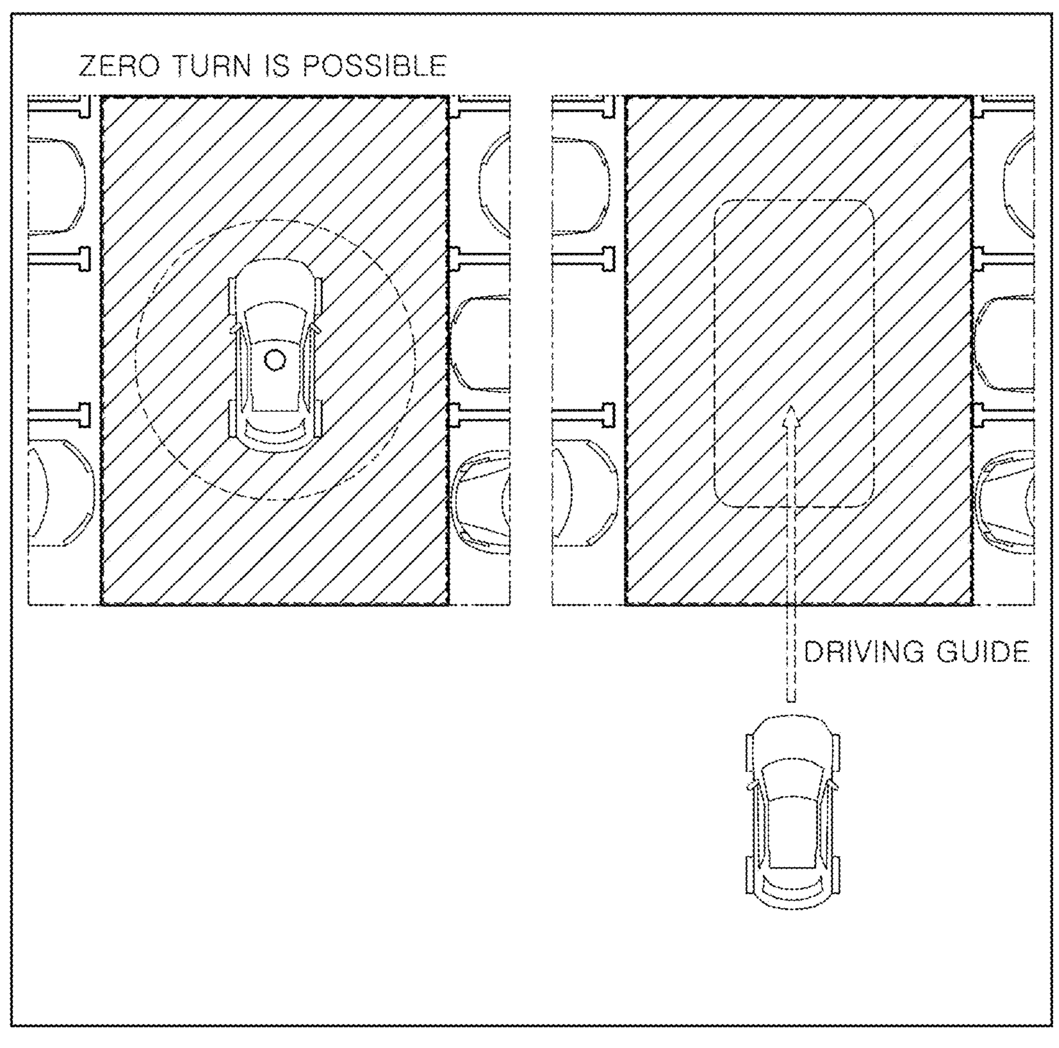
FIGS. 3 and 4 are diagrams illustrating examples of providing information on switchable steering modes according to one embodiment of the present disclosure.
Figure 4:
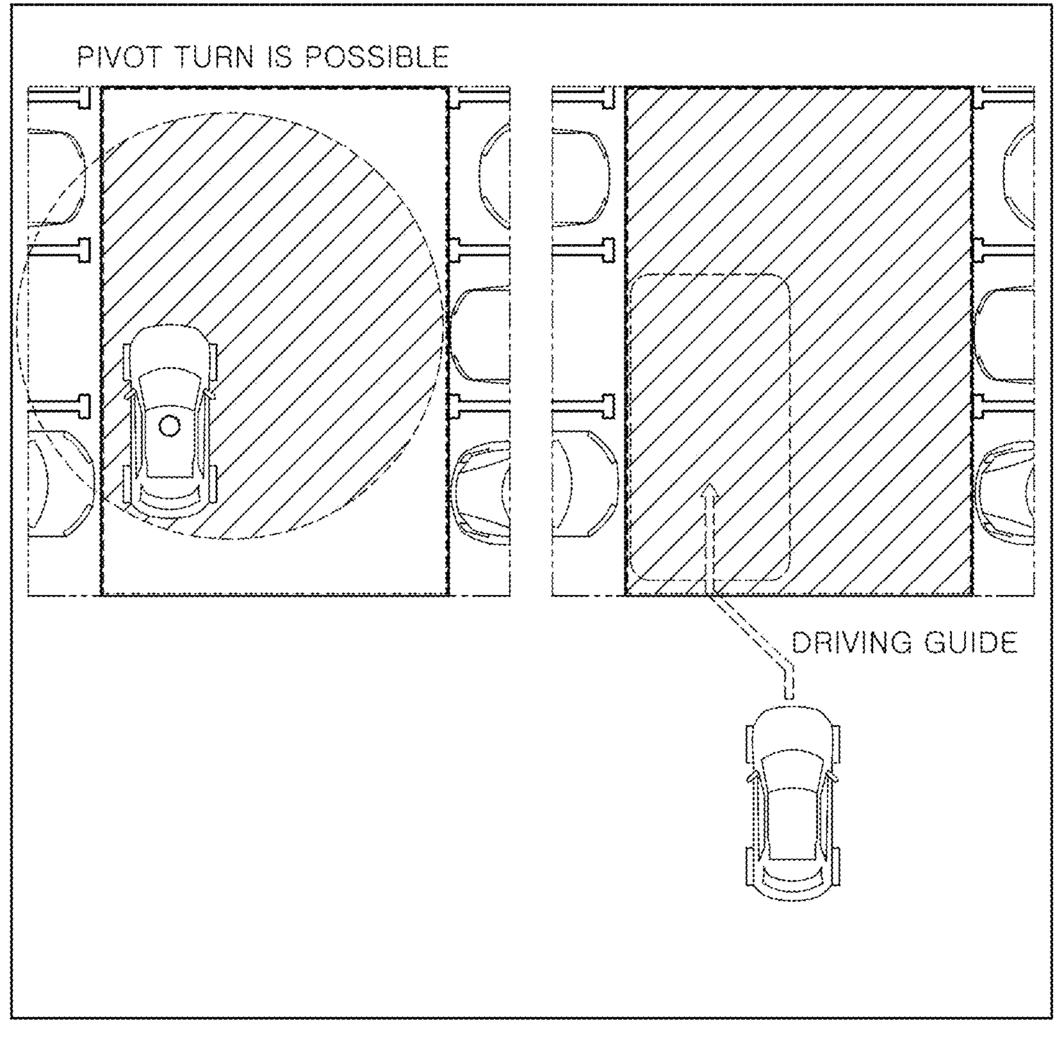

F For example, when a zero turn is possible as shown in FIG. 3 or a pivot turn is possible as shown in FIG. 4, the processor 140 may provide the driver with a driving guidance on an appropriate position for performing each mode together with information on a possible steering mode.

Figure 5A:
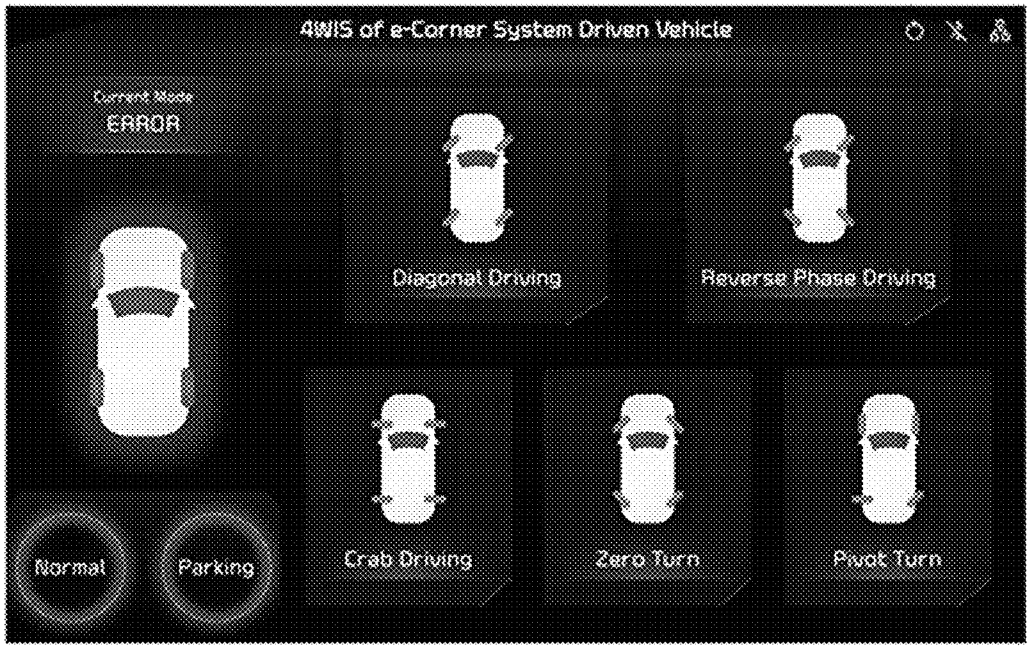
FIGS. 5A and 5B are diagrams illustrating an example of providing the information on the switchable steering mode as a highlight according to one embodiment of the present disclosure.
Figure 5B:
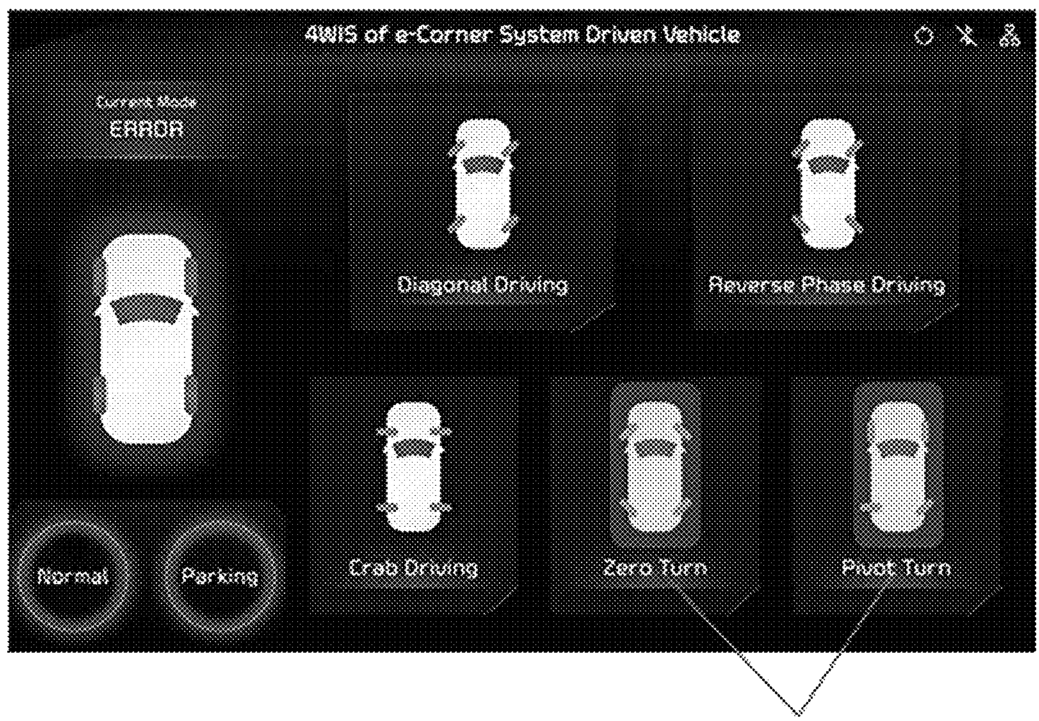

In this case, as shown in FIGS. 5A and 5B, the processor 140 may display the information on the steering mode in which the trajectory switching is possible, i.e., a zero-turn mode and a pivot-turn mode, as highlighted 510 on a screen, thereby enabling the driver to easily recognize the possible mode.

During the zero turn or the pivot turn, the processor 140 may provide the driver with information on an angle at which the vehicle rotates in real-time, thereby enabling the driver to visually determine whether a parking line angle is aligned.

In this case, during the zero turn or the pivot turn, the processor 140 may provide the driver with the information on the angle at which the vehicle rotates together with surrounding region information in real-time.

Meanwhile, the processor 140 may acquire current location information through navigation of the vehicle and calculate reference location information for performing each steering mode on the basis of the acquired current location information and the measured area information.

In this case, when any one of the steering modes in which the trajectory switching is possible is selected according to the manipulation of the input button 120, the processor 140 may provide the driver with the calculated reference position information through imaging in the form of a plan view together with the measured area information and the current position information.

In addition, when any one of the steering modes in which the trajectory switching is possible is selected according to the manipulation of the input button 120, the processor 140 may provide the driver with a notification signal indicating that the steering mode of the corner module device is switched visually and audibly.

Meanwhile, when the processor 140 provides the driver with feedback regarding the mode switching of the vehicle corner module device, for example, the processor 140 may provide visual feedback through a cluster or audio visual navigation (AVN) and auditory feedback through a vehicle speaker. In addition, when a manipulation is performed through an external device such as a mobile phone or a tablet, the processor 140 may provide feedback from the external device and may also provide feedback from the cluster and the AVN by linking with the vehicle. A detailed description thereof is as follows.

1. Mode switching feedback providing method in cluster

When a default screen of the cluster is set to an e-corner mode (a steering mode of the vehicle corner module device), always displaying a current mode and a top-view image of the vehicle capable of displaying wheel movement.

When the driver switches a mode, playing an animation of each of four wheels back.

When the vehicle moves in a left, right, clockwise, or counterclockwise direction, displaying a current state through a motion in which the vehicle is moving together with a corresponding direction with an arrow.

When the default screen is not the e-corner mode, and when the mode is switched, temporarily switching to the e-corner mode, playing a wheel steering animation back, and displaying a switched mode for 5 seconds, and then switching to the original screen.

When the default screen is not the e-corner mode, the time for displaying the switched mode may be changed by the user (e.g., 3 seconds, 5 seconds, 7 seconds, or 10 seconds).

When the mode switching fails, displaying a warning message (e.g., "E-corner system operation error occurred. Please check the system.").

2. E-corner mode switching feedback providing method in AVN 2.1. Widget

Displaying a top-view image of the vehicle capable of expressing the wheel movement, and displaying the current mode as text.

When the driver switches a mode, playing an animation of each of four wheels back.

When the vehicle moves in a left, right, clockwise, or counterclockwise direction, displaying a current state through a motion in which the vehicle is moving together with a corresponding direction with an arrow.

Widget may be pinned to the screen and used, and the user may set the widget to appear only when the mode is switched.

When the mode switching fails, displaying a warning message.

2.2. Full-screen menu

When the full-screen menu is executed, various information such as a status of the e-corner system and a status of each wheel may be checked in addition to the top view image of the vehicle.

Information on a steering angle, a driving force, and a braking force for each wheel may be checked.

A detailed motion for wheel movement is provided by utilizing a screen region that is wider than that of the cluster or the widget.

When the mode is switched, a current steering angle of the wheel and a steering angle to be changed are displayed simultaneously so that when the switching of the mode is terminated may be visually checked.

The steering angle to be changed has a color and transparency different from those of an actual wheel status.

After the mode change is completed, a motion in which the vehicle image displayed on the screen moves in a direction in which the vehicle is moving is displayed.

When the mode switching fails, a warning message is displayed.

3. E-corner mode switching feedback providing method through speaker

Providing different feedback according to a setting of the driver.

Allowing a voice guidance, a simple notification sound, and silence to be selected.

Example of a voice guidance: "This is a crab driving mode."→"Crab driving to the right."→"Acceleration is possible now."

When the voice guidance is not set, playing a short notification sound back at a point of time when the voice guidance should be activated to focus on a screen guide.

Using different notification sounds as a notification sound during the mode switching, a movement direction selection notification sound, and a mode switching completion notification sound.

When a system error occurs, providing a voice guidance regardless of the user setting (e.g., "An e-corner system operation error occurs. Please check the system.").

4. Mode switching feedback providing method when e-corner system is manipulated using external device An e-corner system manipulation app used on an external device includes a text region displaying a current e-corner mode and a button capable of switching an e-corner mode.

When the driver switches an e-corner steering mode, an operation is as follows.

1) Touching a button of a mode to be switched.
2) Notifying voice and pop-up messages for the selected mode (ON/OFF possible).
3) Waiting until a steering mode change completion signal is received from a controller of the e-corner system.
4) Playing a steering angle movement animation on the screen while waiting for a completion signal reception (linkage of a real-time steering angle).
5) When the completion signal is received, updating a voice notification for the switched mode and the text region displaying the current mode.

Figure 6:
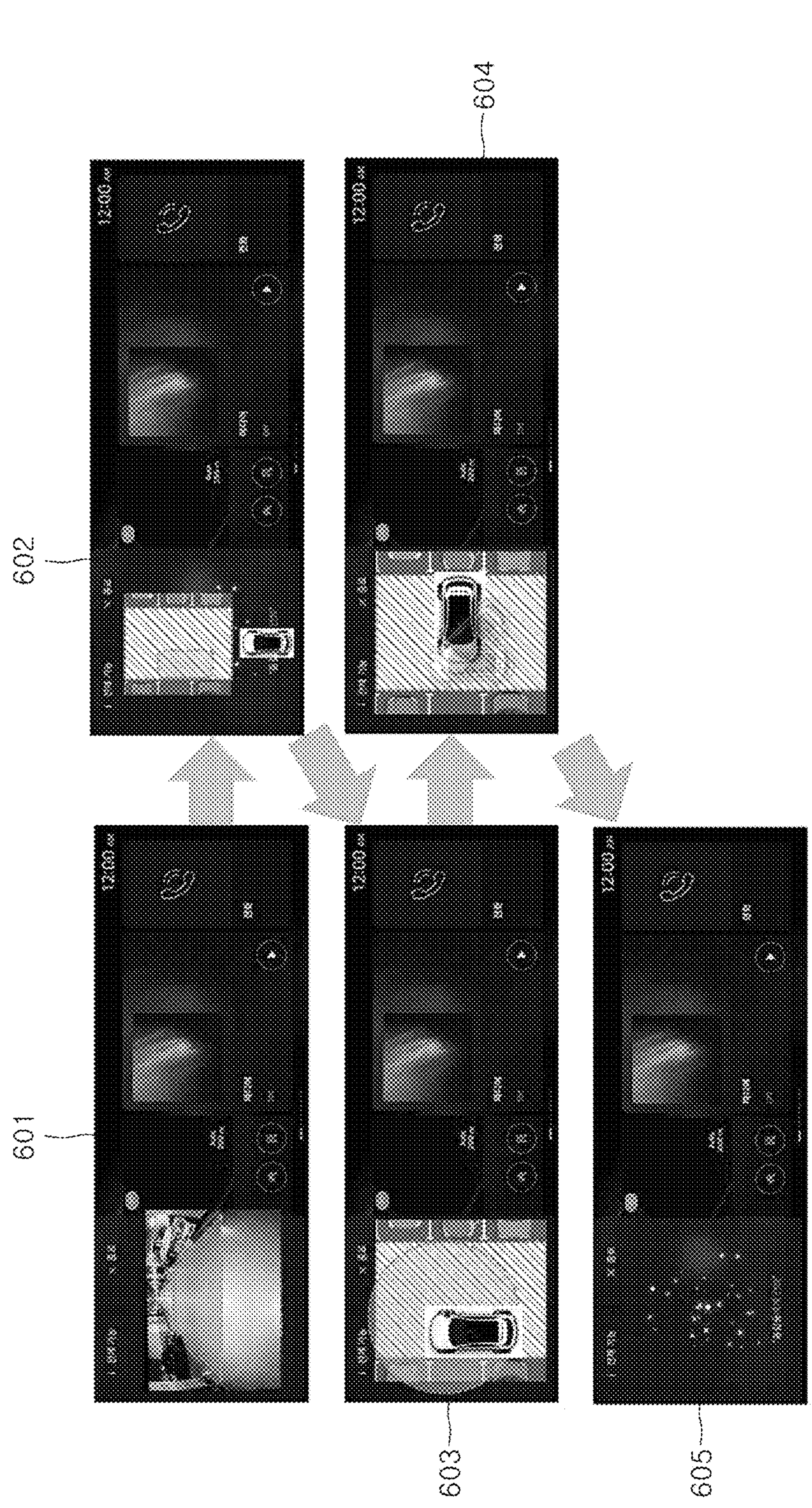
FIG. 6 is an exemplary diagram for describing a steering mode guidance process of a vehicle corner module device according to one embodiment of the present disclosure.

FIG. 6 is an exemplary diagram for describing a steering mode guidance process of a vehicle corner module device according to one embodiment of the present disclosure.

Referring to FIG. 6, first, a front vehicle entering image and an area are sensed from a first screen 601 and are fed back in real-time.

Next, a second screen 602 provides a top view of the entering situation when an area calculation space is confirmed (fixing the measured area space and linking the vehicle entering situation in real-time). In this case, the second screen 602 may provide a guide by highlighting the movement location.

Next, a third screen 603 provides an enlarged detailed mode switching screen after the vehicle enters.

Subsequently, a fourth screen 604 provides a mode switching status in real-time.

Next, a fifth screen 605 is switched to a front parking line screen when the vehicle enters a parking lot.

Figure 7:
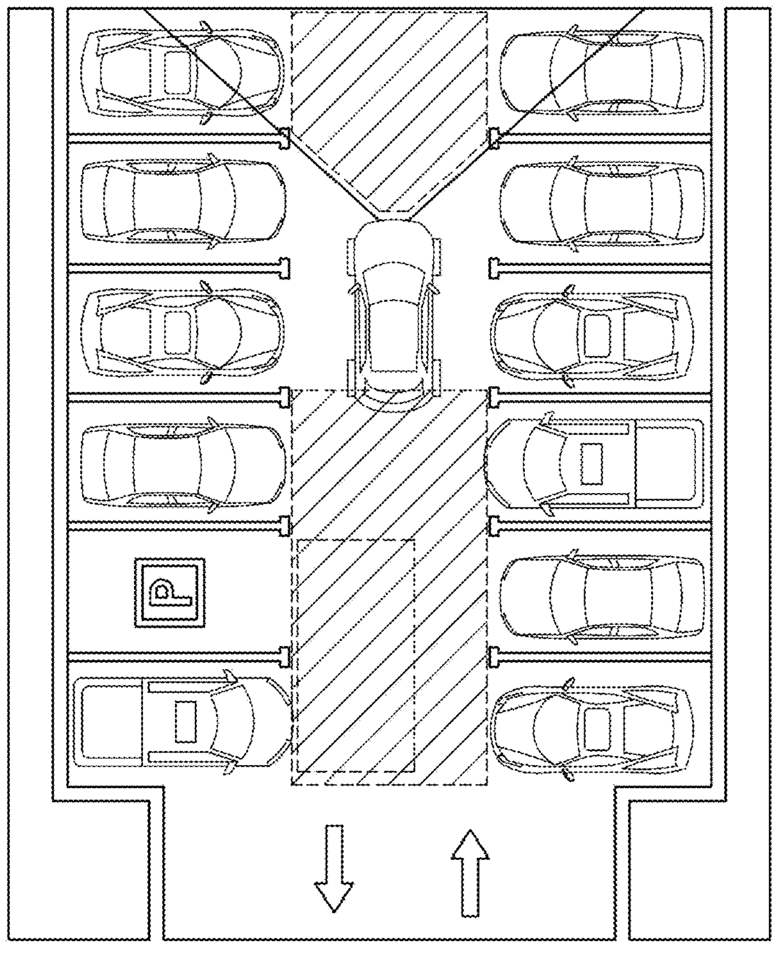
FIGS. 7 and 8 are diagrams illustrating examples of guiding switchable steering modes in a dead-end space situation.
Figure 8:
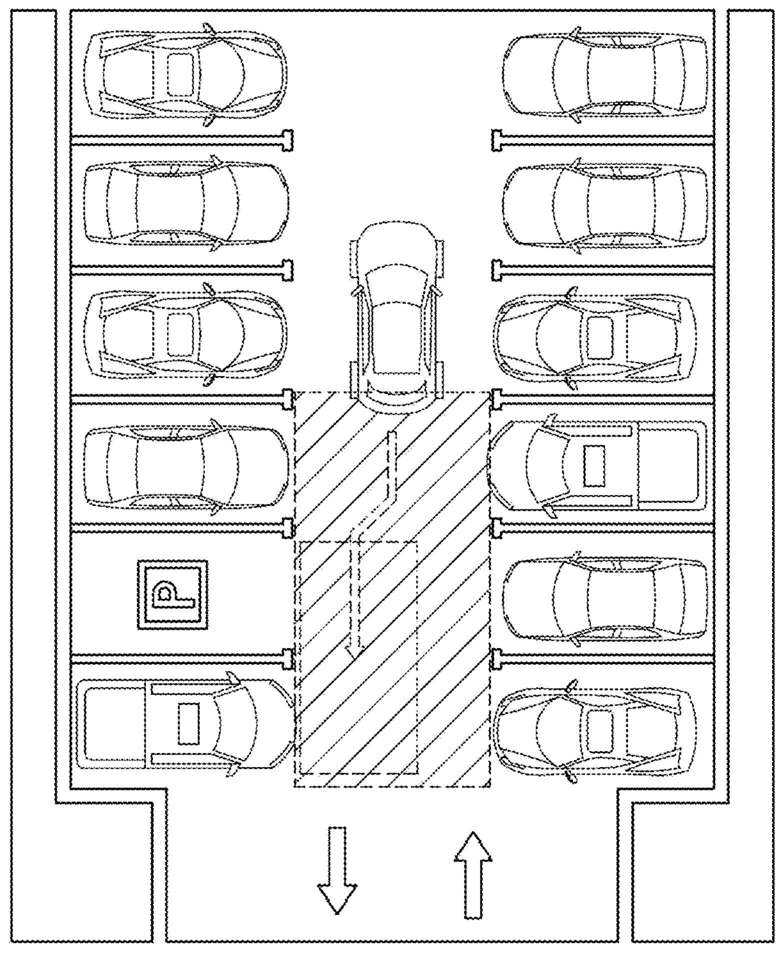

FIGS. 7 and 8 are diagrams illustrating examples of guiding switchable steering modes in a dead-end space situation.

As shown in FIGS. 1 and 7, the processor 140 may inform whether an operation is possible in a current situation when a zero turn is performed in a dead-end space without a parking space and guide the mode to be switched.

The processor 140 may generate a top view image on the basis of the already sensed space result (previously measured space region), such as moving backwards a few meters as necessary, and provide the top view image together with vehicle location information.

In this case, as shown in FIG. 8, the processor 140 may also provide a backward movement guidance to the driver.

The processor 140 may be linked with a surround view monitor (SVM) camera to display a road projection image, thereby providing information to the driver to enable recognize whether a problem occurs when turning. The processor 140 may measure a pre-region suitable for road and space situations such as diagonal driving as well as parking and provide a guidance in the switched mode.

In this way, the processor 140 may basically provide information provided in advance to the driver, thereby providing manual mode switching and driving convenience, but the present disclosure is not limited thereto, and various implementations are possible. For example, the processor 140 may be operable to drive in conjunction with autonomous driving and an autonomous parking system.

Figure 9:
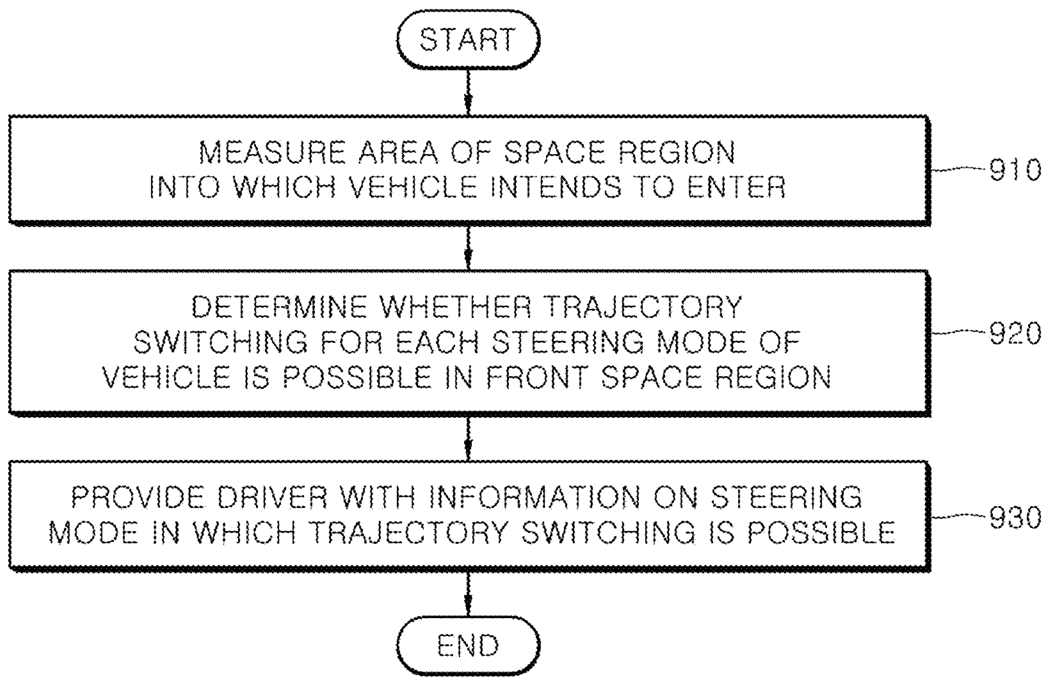
FIG. 9 is a flowchart for describing a steering mode guidance method of a vehicle corner module device according to one embodiment of the present disclosure.

FIG. 9 is a flowchart for describing a steering mode guidance method of a vehicle corner module device according to one embodiment of the present disclosure.

The steering mode guidance method of a vehicle corner module device described herein is merely one example of the present disclosure. In addition, various operations may be added as necessary as follows, and operations below may also be performed by changing the order of the operations so that the present disclosure is not limited to each operation and sequence described below.

First, referring to FIGS. 1 and 9, in operation 910, the processor 140 may measure an area of a space region into which the vehicle intends to enter using the sensor 110.

In this case, when the driver of the vehicle manipulates the input button 120 or a speed of the vehicle decreases to a preset speed or less, the processor 140 may activate the sensor 110 to measure the area of the space region into which the vehicle intends to enter.

Next, in operation 920, the processor 140 may determine whether trajectory switching for each steering mode of the vehicle is possible in the space region into which the vehicle intends to enter on the basis of the measured area information.

Specifically, the processor 140 may calculate a vehicle moving trajectory for each steering mode on the basis of vehicle-specific specification information stored in the memory 130. Thereafter, the processor 140 may compare and match the calculated vehicle moving trajectory with the measured area information to determine whether the trajectory switching for each steering mode of the vehicle is possible in the space region into which the vehicle intends to enter.

Next, in operation 930, the processor 140 may provide information on the steering mode in which the trajectory switching is possible on the basis of the determination result.

In this case, the processor 140 may provide the information to the driver visually and/or audibly. In addition, the processor 140 may display information on a steering mode in which the trajectory switching is possible by highlighting, activating, and displaying the information on the screen, thereby allowing the driver to easily recognize the possible mode.

In addition, during the zero turn or the pivot turn, the processor 140 may provide the driver with information on an angle at which the vehicle rotates in real-time, thereby enabling the driver to visually determine whether a parking line angle is aligned.

In this case, during the zero turn or the pivot turn, the processor 140 may provide the driver with the information on the angle at which the vehicle rotates together with surrounding region information in real-time.

Meanwhile, the processor 140 may acquire current location information through navigation of the vehicle and calculate reference location information for performing each steering mode on the basis of the acquired current location information and the measured area information.

In this case, when any one of the steering modes in which the trajectory switching is possible is selected according to the manipulation of the input button 120, the processor 140 may provide the driver with the calculated reference position information through imaging in the form of a plan view together with the measured area information and the current position information.

In addition, when any one of the steering modes in which the trajectory switching is possible is selected according to the manipulation of the input button 120, the processor 140 may provide the driver with a notification signal indicating that the steering mode of the corner module device is switched visually and audibly.

According to one embodiment of the present disclosure, driving safety can be provided by determining whether switching is possible for each steering mode in relation to steering mode switching of a vehicle corner module device.

According to one embodiment of the present disclosure, a driver can be visually and audibly notified of a change in various driving steering configurations through the vehicle corner module device.

According to one embodiment of the present disclosure, safe driving can be provided to the driver through visual feedback through a cluster and audio visual navigation (AVN) and auditory feedback through a speaker in a vehicle.

According to one embodiment of the present disclosure, safe driving can be provided to the driver through visual/auditory feedback and linkage with a controller of the vehicle when a manipulation is performed through a mobile phone or a tablet.

What is claimed is:

1. A steering mode guidance system of a vehicle corner module device for a vehicle, the system comprising:
- a plurality of corner module devices each corresponding to a wheel of the vehicle, the corner module devices configured to steer the vehicle;
- a sensor configured to detect a space region in front of the vehicle; and
- a processor configured to:
  - control the sensor to measure an area of the space region into which the vehicle intends to enter;
  - based on the measured area, determine whether trajectory switching is possible for each steering mode of the vehicle in the space region such that the vehicle can safely position itself at the space region; and
  - provide, to a driver of the vehicle, information on a steering mode in which the trajectory switching is possible on the basis of the determination result,
- wherein the steering mode comprises one of diagonal driving, reverse phase driving, crab driving, zero turn, and pivot turn.

2. The system of claim 1, further comprising:
an input button, wherein the processor is further configured to:

activate an automatic sensing function of the sensor in response to a manipulation of the input button;

sense the space region into which the vehicle intends to enter through the automatic sensing function of the sensor to generate sensing data; and measure the area of the space region using the generated sensing data.

3. The system of claim 2, wherein the processor is further configured to:

calculate reference position information for performing each steering mode on the basis of current position information acquired through navigation of the vehicle and the measured area information; and provide a driver of the vehicle with the calculated reference position information in the form of a plan view image by imaging the calculated reference position information together with the measured area information and the current position information in response to any one of steering modes in which the trajectory switching is possible being selected according to a manipulation of the input button.

4. The system of claim 2, wherein, in response to any one of steering modes in which the trajectory switching is possible being selected according to the manipulation of the input button, the processor is further configured to provide the driver with a notification signal indicating that the steering mode of the corner module device is switched visually and audibly.

5. The system of claim 1, wherein, in response to a speed of the vehicle decreasing to a preset speed or less, the processor is further configured to:

activate an automatic sensing function of the sensor;

sense the space region into which the vehicle intends to enter through the automatic sensing function of the sensor to generate sensing data; and measure the area of the space region using the generated sensing data.

6. The system of claim 1, further comprising:

a memory, wherein the processor is further configured to:

calculate a vehicle moving trajectory for each steering mode on the basis of vehicle-specific specification information stored in the memory;

compare and match the calculated vehicle moving trajectory with the measured area information; and determine whether the trajectory switching for each steering mode is possible in the space region.

7. The system of claim 1, wherein the steering mode in which the trajectory switching is possible includes a zero-turn mode and a pivot-turn mode.

8. A processor-implemented steering mode guidance method of a vehicle corner module device for a vehicle, the vehicle including a plurality of corner module devices each corresponding to a wheel of the vehicle and configured to steer the vehicle, the method comprising:

detecting a space region in front of the vehicle;

measuring an area of the space region into which the vehicle intends to enter using a sensor;

based on the measured area, determining whether trajectory switching for each steering mode of the vehicle is possible in the space region such that the vehicle can safely position itself at the space region; and providing to a driver of the vehicle, information on a steering mode in which the trajectory switching is possible on the basis of the determination result, wherein the steering mode comprises one of diagonal driving, reverse phase driving, crab driving, zero turn, and pivot turn.

9. The method of claim 8, wherein the measuring of the area of the space region includes:

activating an automatic sensing function of the sensor in response to a manipulation of an input button;

sensing the space region into which the vehicle intends to enter through the automatic sensing function of the sensor and generating sensing data; and measuring the area of the space region using the generated sensing data.

10. The method of claim 8, wherein the measuring of the area of the space region includes:

activating an automatic sensing function of the sensor in response to a speed of the vehicle decreasing to a preset speed or less;

sensing a space region into which the vehicle intends to enter through the automatic sensing function of the sensor and generating sensing data; and measuring, by the processor, the area of the space region using the generated sensing data.

11. The method of claim 8, wherein the determining of whether the trajectory switching for each steering mode of the vehicle is possible includes:

calculating a vehicle moving trajectory for each steering mode on the basis of vehicle-specific specification information stored in a memory; and comparing and matching the generated vehicle moving trajectory with the measured area information to determine whether the trajectory switching for each steering mode is possible in the space region.

12. The method of claim 8, wherein the steering mode in which the trajectory switching is possible includes a zero-turn mode and a pivot-turn mode.

* * * * *